United States Patent
Chu et al.

(10) Patent No.: US 8,332,576 B2
(45) Date of Patent: Dec. 11, 2012

(54) DATA READING METHOD FOR FLASH MEMORY AND CONTROLLER AND STORAGE SYSTEM USING THE SAME

(75) Inventors: Chien-Hua Chu, Hsinchu County (TW); Wei-Chen Teo, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 569 days.

(21) Appl. No.: 12/178,054

(22) Filed: Jul. 23, 2008

(65) Prior Publication Data
US 2009/0216936 A1    Aug. 27, 2009

(30) Foreign Application Priority Data
Feb. 21, 2008   (TW) .............................. 97106058 A (51) Int. Cl.
*G06F 12/00* (2006.01)
(52) U.S. Cl. .................. 711/103; 711/E12.103; 714/52
(58) Field of Classification Search .................. 711/103, 711/E12.103
See application file for complete search history.

(56) References Cited

U.S. PATENT DOCUMENTS

| 5,438,549 A * | 8/1995 | Levy .............................. 365/229 |
| 2006/0004957 A1 * | 1/2006 | Hand et al. .................... 711/113 |
| 2007/0239927 A1 * | 10/2007 | Rogers et al. ................. 711/103 |
| 2008/0082736 A1 * | 4/2008 | Chow et al. .................... 711/103 |
| 2008/0148004 A1 * | 6/2008 | Iren et al. ...................... 711/170 |
| 2009/0172254 A1 * | 7/2009 | Chen ............................. 711/103 |
| 2009/0193174 A1 * | 7/2009 | Reid ............................. 711/100 |

FOREIGN PATENT DOCUMENTS

| CN | 1517884 | 8/2004 |
| CN | 1551243 | 12/2004 |

OTHER PUBLICATIONS

Chinese First Examination Report of China Application No. 200810088562.0, dated Sep. 9, 2010.
Chinese Second Examination Report of China Application No. 200810088562.0, dated May 4, 2011.

\* cited by examiner

*Primary Examiner* — Hashem Farrokh
*Assistant Examiner* — Larry Mackall
(74) *Attorney, Agent, or Firm* — J.C. Patents (57) ABSTRACT

A data reading method suitable for a flash memory storage system having a flash memory is provided, wherein the flash memory is substantially divided into a plurality of blocks and these blocks are grouped into at least a data area and a spare area. The data reading method includes: respectively determining whether the blocks in the data area are frequently read blocks; allocating a buffer storage area corresponding to the frequently read block and copying data stored in the frequently read block to the buffer storage area; and reading the data from the buffer storage area corresponding to the frequently read block when the data stored in the frequently read block is to be read. As described above, data loss caused by read disturb can be effectively prevented.

16 Claims, 10 Drawing Sheets

DATA READING METHOD FOR FLASH MEMORY AND CONTROLLER AND STORAGE SYSTEM USING THE SAME

CROSS-REFERENCE TO RELATED APPLICATION

This application claims the priority benefit of Taiwan application serial no. 97106058, filed Feb. 21, 2008. The entirety of the above-mentioned patent application is hereby incorporated by reference herein and made a part of this specification.

BACKGROUND

1. Technology Field

The present invention generally relates to a data reading method, in particular, to a data reading method for a flash memory and a controller using the same.

2. Description of Related Art

Along with the widespread of digital cameras, camera phones, MP3, and MP4 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides being applied in foregoing portable products, flash memory is also broadly applied to external products such as flash cards and flash drives. Thereby, flash memory has become one of the most focused electronic products in recent years and the development thereof is going toward high storage capacity and high stability.

Generally speaking, flash memories can be categorized into two types according to the process precision thereof: single level cell (SLC) flash memories, and multi level cell (MLC) flash memories. The storage capacity of a MLC flash memory is higher than that of a SLC flash memory; however, the stability of a MLC flash memory is lower than that of a SLC flash memory.

Regardless of MLC flash memory or SLC flash memory, when data stored in the same block is read repeatedly (for example, between 100,000 times and 1,000,000 times), the data read may be incorrect or data stored in this block may even be lost. Such a situation is usually referred as "read disturb" by those having ordinary knowledge in the art. In particular, the system data (for example, a firmware code and a file allocation table (FAT)) of a flash memory storage system is stored in a flash memory, and the system data is frequently read during the operation of the flash memory storage system. Accordingly, a technique for resolving the problem of read disturb has to be provided for effectively preventing data loss caused by read disturb.

SUMMARY

Accordingly, the present invention is directed to a data reading method which can effectively prevent data loss caused by read disturb.

The present invention is directed to a flash memory controller, wherein a data reading method executed by the flash memory controller can effectively prevent data loss caused by read disturb.

The present invention provides a data reading method suitable for a flash memory storage system having a flash memory, wherein the flash memory is substantially divided into a plurality of blocks and these blocks are grouped into at least a data area and a spare area. The data reading method includes: determining whether each of the blocks in the data area is a frequently read blocks; allocating a buffer storage area corresponding to the frequently read block and copying data stored in the frequently read block to the buffer storage area corresponding to the frequently read block; and reading the data from the buffer storage area corresponding to the frequently read block when being about to read the data stored in the frequently read block.

According to an embodiment of the present invention, the step of determining whether each of the blocks in the data is a frequently read blocks includes counting a read number of each block in the data area and determining whether the read number of each of the blocks in the data area is greater than a read frequency threshold, wherein a block in the data area is determined to be a frequently read block if the read number of the block is greater than the read frequency threshold.

According to an embodiment of the present invention, the data reading method further includes selecting a block from the spare area of the flash memory as the buffer storage area corresponding to the frequently read block.

According to an embodiment of the present invention, the data reading method further includes counting a read number of the buffer storage area corresponding to the frequently read block and determining whether the read number of the buffer storage area corresponding to the frequently read block is greater than a buffer read threshold, wherein if the read number of the buffer storage area corresponding to the frequently read block is greater than the buffer read threshold, data stored in the buffer storage area corresponding to the frequently read block is copied to another block in the spare area of the flash memory and this another block is served as the buffer storage area corresponding to the frequently read block.

According to an embodiment of the present invention, the data reading method further includes counting the read number of the buffer storage area corresponding to the frequently read block and determining whether the read number of the buffer storage area corresponding to the frequently read block is greater than the buffer read threshold, wherein if the read number of the buffer storage area corresponding to the frequently read block is greater than the buffer read threshold, data stored in the frequently read block is copied to another block in the spare area of the flash memory and this another block is served as the buffer storage area corresponding to the frequently read block.

According to an embodiment of the present invention, the data reading method further includes copying data stored in the frequently read block to another block in the spare area of the flash memory and serving this another block as the buffer storage area corresponding to the frequently read block if an error occurs while reading data from the buffer storage area corresponding to the frequently read block.

According to an embodiment of the present invention, the data reading method further includes executing an error correcting operation so as to determine whether any error occurs while reading data from the buffer storage area corresponding to the frequently read block.

According to an embodiment of the present invention, the data reading method further includes selecting a block from another flash memory or using a static random access memory (SRAM) as the buffer storage area corresponding to the frequently read block.

According to an embodiment of the present invention, the frequently read block in the data area stores a firmware code or a file allocation table (FAT) of the flash memory storage system.

The present invention provides a flash memory controller suitable for a flash memory storage system having a flash memory, wherein the flash memory is substantially divided into a plurality of blocks and these blocks are grouped into at least a data area and a spare area. The flash memory controller includes a microprocessor unit and a memory interface. The memory interface is coupled to the microprocessor unit and used for accessing the flash memory. The microprocessor unit determines whether each of the blocks in the data area is a frequently read blocks. The microprocessor unit allocates a buffer storage area corresponding to the frequently read block and copies data stored in the frequently read block to the buffer storage area corresponding to the frequently read block. When subsequently the microprocessor unit is about to read data from the frequently read block, the microprocessor unit reads the data from the buffer storage area corresponding to the frequently read block.

According to an embodiment of the present invention, the microprocessor unit respectively counts a read number of each block in the data area and determines the block in the data area as a frequently read block when the microprocessor unit determines that the read number of the block is greater than a read frequency threshold.

According to an embodiment of the present invention, the microprocessor unit selects a block from the spare area of the flash memory as the buffer storage area corresponding to the frequently read block.

According to an embodiment of the present invention, the microprocessor unit counts a read number of the buffer storage area corresponding to the frequently read block and determines whether the read number of the buffer storage area corresponding to the frequently read block is greater than a buffer read threshold, wherein if the read number of the buffer storage area corresponding to the frequently read block is greater than the buffer read threshold, the microprocessor unit copes the data stored in the buffer storage area corresponding to the frequently read block to another block in the spare area of the flash memory and serves this another block as the buffer storage area corresponding to the frequently read block.

According to an embodiment of the present invention, the microprocessor unit counts the read number of the buffer storage area corresponding to the frequently read block and determines whether the read number of the buffer storage area corresponding to the frequently read block is greater than the buffer read threshold, wherein if the read number of the buffer storage area corresponding to the frequently read block is greater than the buffer read threshold, the microprocessor unit copies the data stored in the frequently read block to another block in the spare area of the flash memory and serves this another block as the buffer storage area corresponding to the frequently read block.

According to an embodiment of the present invention, if an error occurs while reading data from the buffer storage area corresponding to the frequently read block, the microprocessor unit copies the data stored in the frequently read block to another block in the spare area of the flash memory and serves this another block as the buffer storage area corresponding to the frequently read block.

According to an embodiment of the present invention, the flash memory controller further includes an error correcting unit used for determining whether any error occurs while reading data form the buffer storage area corresponding to the frequently read block.

According to an embodiment of the present invention, the microprocessor unit selects a block from another flash memory or utilizes a SRAM as the buffer storage area corresponding to the frequently read block.

According to an embodiment of the present invention, the frequently read block in the data area stores a firmware code or a FAT.

According to an embodiment of the present invention, the flash memory is a single level cell (SLC) NAND flash memory or a multi level cell (MLC) NAND flash memory.

According to an embodiment of the present invention, the flash memory storage system is a flash drive, a flash memory card, or a solid state drive (SSD).

The present invention provides a flash memory storage system including a bus connection interface, a flash memory, and a flash memory controller. The bus connection interface is used for connecting to a host. The flash memory is divided into a plurality of blocks, and these blocks are grouped into at least a data area and a spare area. The flash memory controller is coupled to the bus connection interface and the flash memory and determines whether each of the blocks in the data area is a frequently read blocks. The flash memory controller allocates a buffer storage area corresponding to the frequently read block and copies data stored in the frequently read block to the buffer storage area corresponding to the frequently read block. When subsequently the flash memory controller is about to read data from the frequently read block, the flash memory controller reads the data from the buffer storage area corresponding to the frequently read block.

According to an embodiment of the present invention, the flash memory controller respectively counts a read number of each block in the data area and determines the block in the data area as a frequently read block when the flash memory controller determines that the read number of the block is greater than a read frequency threshold.

According to an embodiment of the present invention, the flash memory controller selects a block from the spare area of the flash memory as the buffer storage area corresponding to the frequently read block.

According to an embodiment of the present invention, the flash memory controller counts a read number of the buffer storage area corresponding to the frequently read block and determines whether the read number of the buffer storage area corresponding to the frequently read block is greater than a buffer read threshold, wherein if the read number of the buffer storage area corresponding to the frequently read block is greater than the buffer read threshold, the flash memory controller copes the data stored in the buffer storage area corresponding to the frequently read block to another block in the spare area of the flash memory and serves this another block as the buffer storage area corresponding to the frequently read block.

According to an embodiment of the present invention, the flash memory controller counts the read number of the buffer storage area corresponding to the frequently read block and determines whether the read number of the buffer storage area corresponding to the frequently read block is greater than the buffer read threshold, wherein if the read number of the buffer storage area corresponding to the frequently read block is greater than the buffer read threshold, the flash memory controller copies the data stored in the frequently read block to another block in the spare area of the flash memory and serves this another block as the buffer storage area corresponding to the frequently read block.

In the present invention, data stored in a frequently read block in a flash memory is stored into a buffer storage area, and the data is subsequently read from the buffer storage area. Thereby, data loss caused by read disturb can be effectively prevented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to prevent data loss caused by read disturb when data stored in a block of a flash memory is read repeatedly, a data reading method is provided by the present invention, wherein the data stored in the frequently read block is copied to a buffer storage area and the data is subsequently read from the buffer storage area. Thereby, data stored in the original block will not be lost due to read disturb. Several example embodiments of the present invention will be described below with reference to accompanying drawings.

[First Embodiment]

Figure 1:
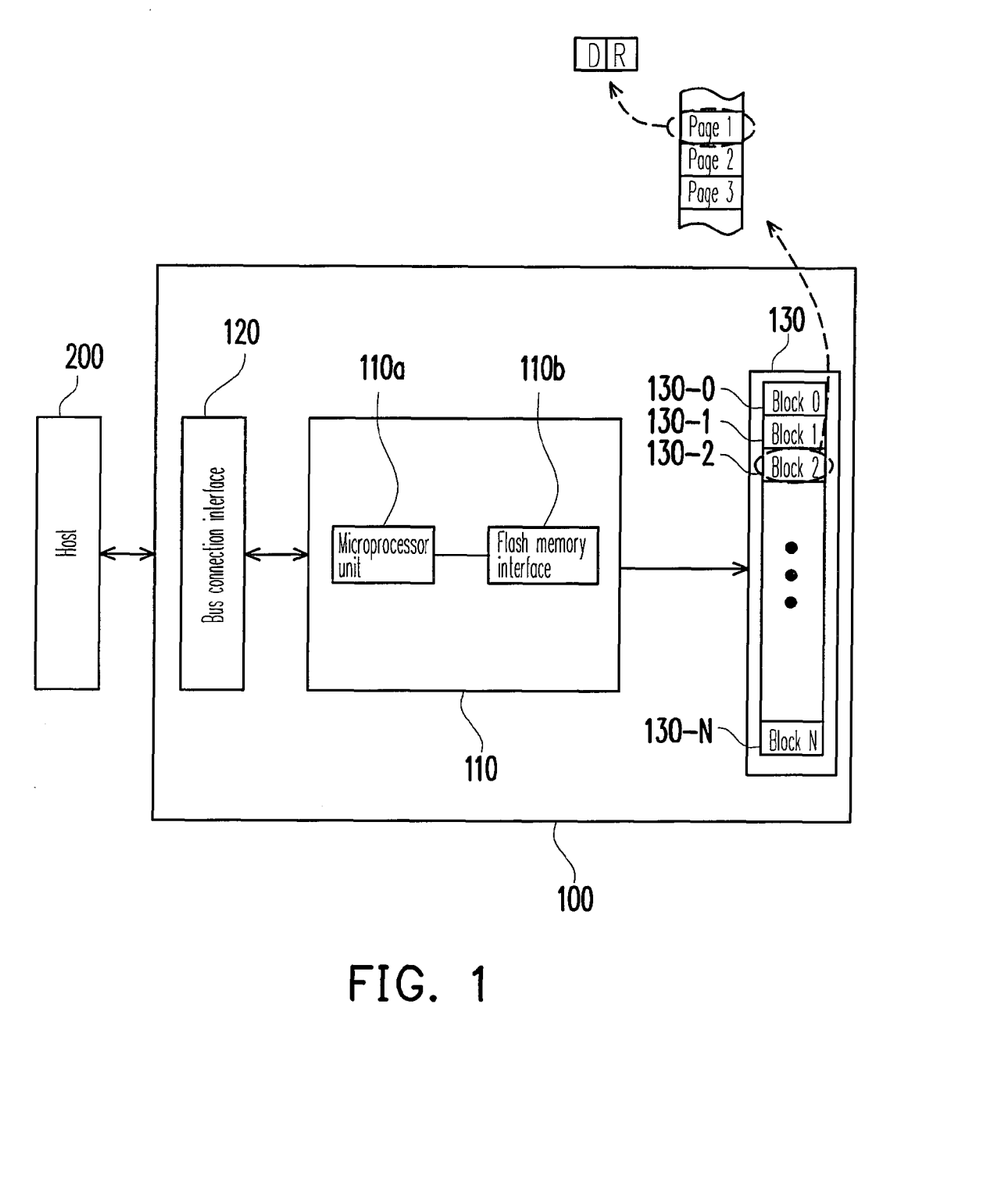
FIG. 1 is a schematic block diagram of a flash memory storage system according to a first embodiment of the present invention.

FIG. 1 is a schematic block diagram of a flash memory storage system according to the first embodiment of the present invention. Referring to FIG. 1, the flash memory storage system 100 includes a flash memory controller 110, a bus connection interface 120, and a flash memory 130. The flash memory storage system 100 is usually used along with a host 200 so as to allow the host 200 to write data into the flash memory storage system 100 or read data from the flash memory storage system 100. In the present embodiment, the flash memory storage system 100 is a flash drive. However, in another embodiment of the present invention, the flash memory storage system 100 may also be a flash memory card or a solid state drive (SSD).

The flash memory controller 110 controls the operations of the bus connection interface 120 and the flash memory 130, such as data storing operation, data reading operation, and data erasing operation. The flash memory controller 110 includes a microprocessor unit 110a and a flash memory interface 110b.

Figure 3:
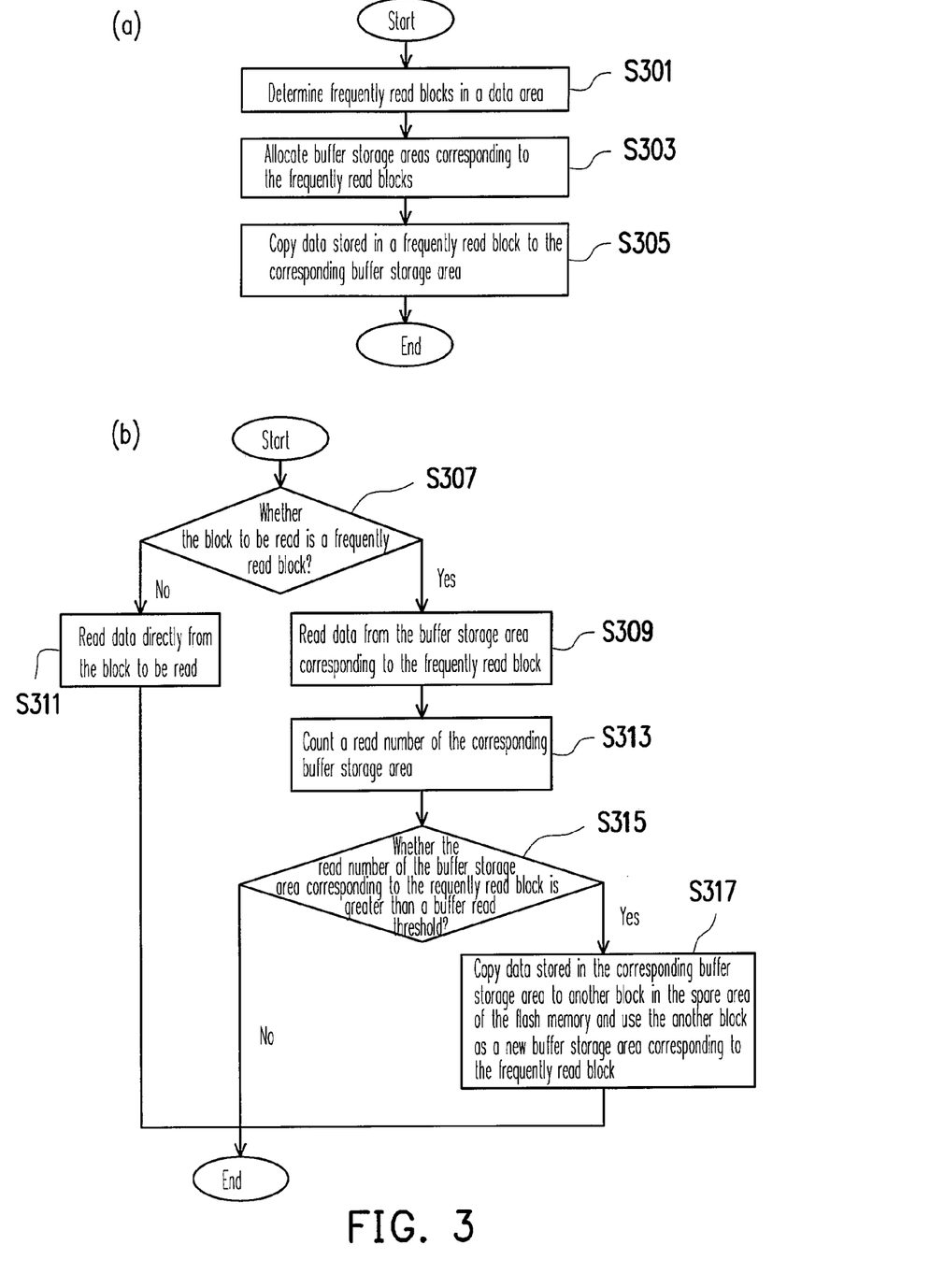
FIG. 3 is a flowchart of a data reading method according to the first embodiment of the present invention.

The microprocessor unit 110a manages and operates the flash memory 130. For example, the microprocessor unit 110a executes a wear levelling function, manages bad blocks, and maintains a mapping table etc. In particular, in the present embodiment, the microprocessor unit 110a executes a data reading procedure as shown in FIG. 3.

The flash, memory interface 110b is coupled to the microprocessor unit 110a and used for accessing the flash memory 130. In other words, the data to be written into the flash memory 130 by the host 200 is converted by the flash memory interface 110b into a format acceptable to the flash memory 130.

Additionally, the flash memory controller 110 may further include other regular modules in a flash memory, such as a memory management module, a buffer memory, and a power management module (not shown).

The bus connection interface 120 is used for connecting to the host 200. In the present embodiment, the bus connection interface 120 is a USB interface. However, the present invention is not limited thereto, and the bus connection interface 120 may also be a PCI Express interface, an IEEE 1394 interface, a SATA interface, a MS interface, a MMC interface, a SD interface, a CF interface, an IDE interface, or other suitable data transmission interfaces.

The flash memory 130 is coupled to the flash memory controller 110 and used for storing data. The flash memory 130 is substantially divided into a plurality of physical blocks 130-0~130-N, and for the convenience of description, these physical blocks will be simply referred as blocks thereinafter. Generally speaking, data in a flash memory is erased in unit of blocks. Namely, each block contains the smallest number of memory cells which are erased together. A block is usually divided into a plurality of pages, and each page is served as the smallest programming unit. However, it should be noted that in some other different flash memory designs, the smallest programming unit may also be sector, namely, each page contains a plurality of sectors and each sector is served as the smallest programming unit. In other words, page is the smallest unit for writing and reading data. A page usually includes a user data area D and a redundant area R. The user data area D is used for storing user data, and the redundant area is used for storing system data (for example, an error correcting code (ECC)).

Generally speaking, the user data area D has 512 bytes and the redundant area R has 16 bytes in order to correspond to the size of sectors in a disk drive. In other words, a page is a sector. However, a page may also be composed of a plurality of sectors. For example, a page may include four sectors.

Generally speaking, a block may be composed of any number of pages, such as 64 pages, 128 pages, and 256 pages etc. The blocks 130-0~130-N are usually grouped into a plurality of zones. By managing operations of a flash memory based on zones, parallelism of the operations can be increased and the management thereof can be simplified.

Below, the operations of a flash memory according to the present invention will be described in detail with reference to accompanying drawings. It should be understood that the terms "select", "move", and "substitute" used in following description only refer to logical operations performed to a flash memory. In other words, the physical positions of the blocks in the flash memory are not changed; instead, these blocks in the flash memory are only operated logically.

Figure 2A:
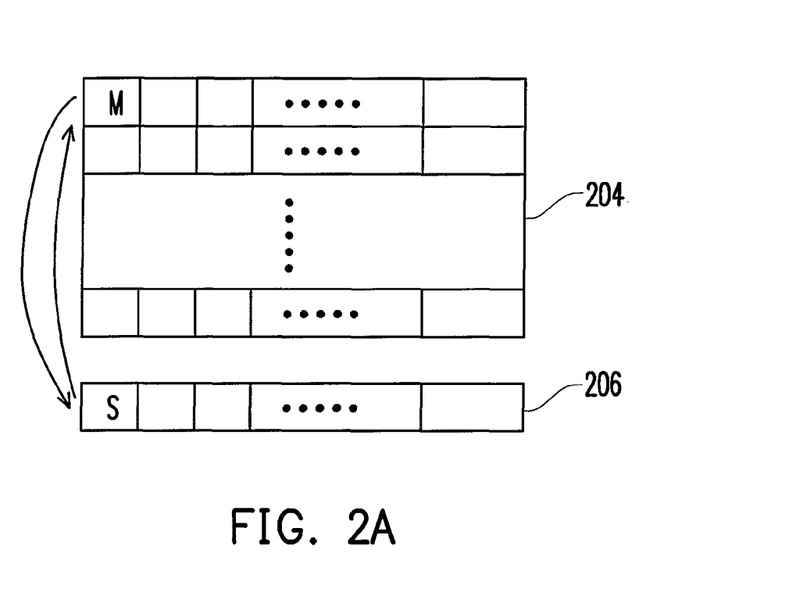
FIGS. 2A~2C are detailed block diagrams of a flash memory and the operations thereof according to the first embodiment of the present invention.
Figure 2B:
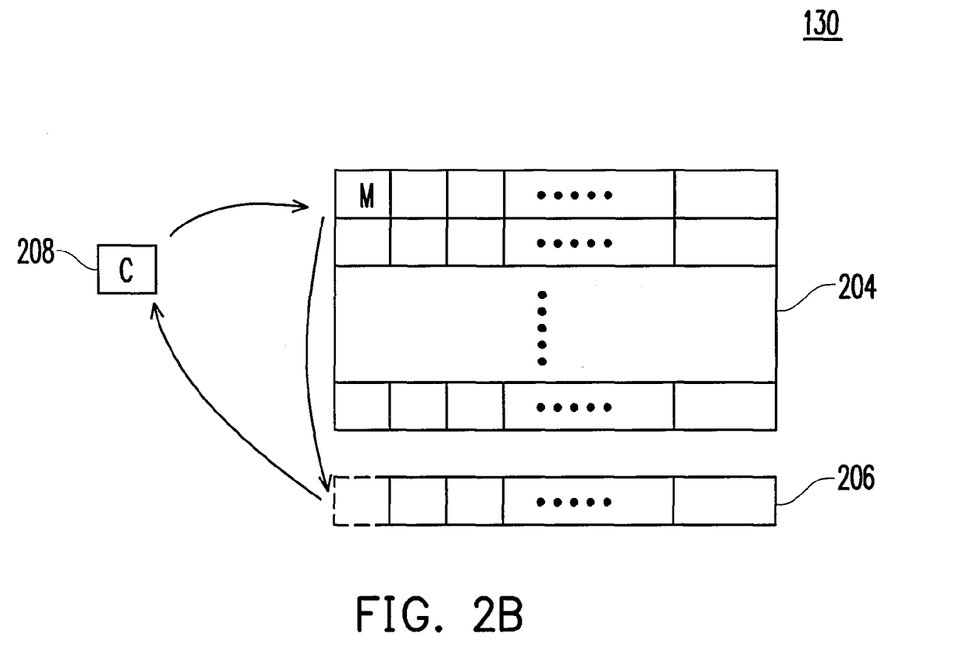
Figure 2C:
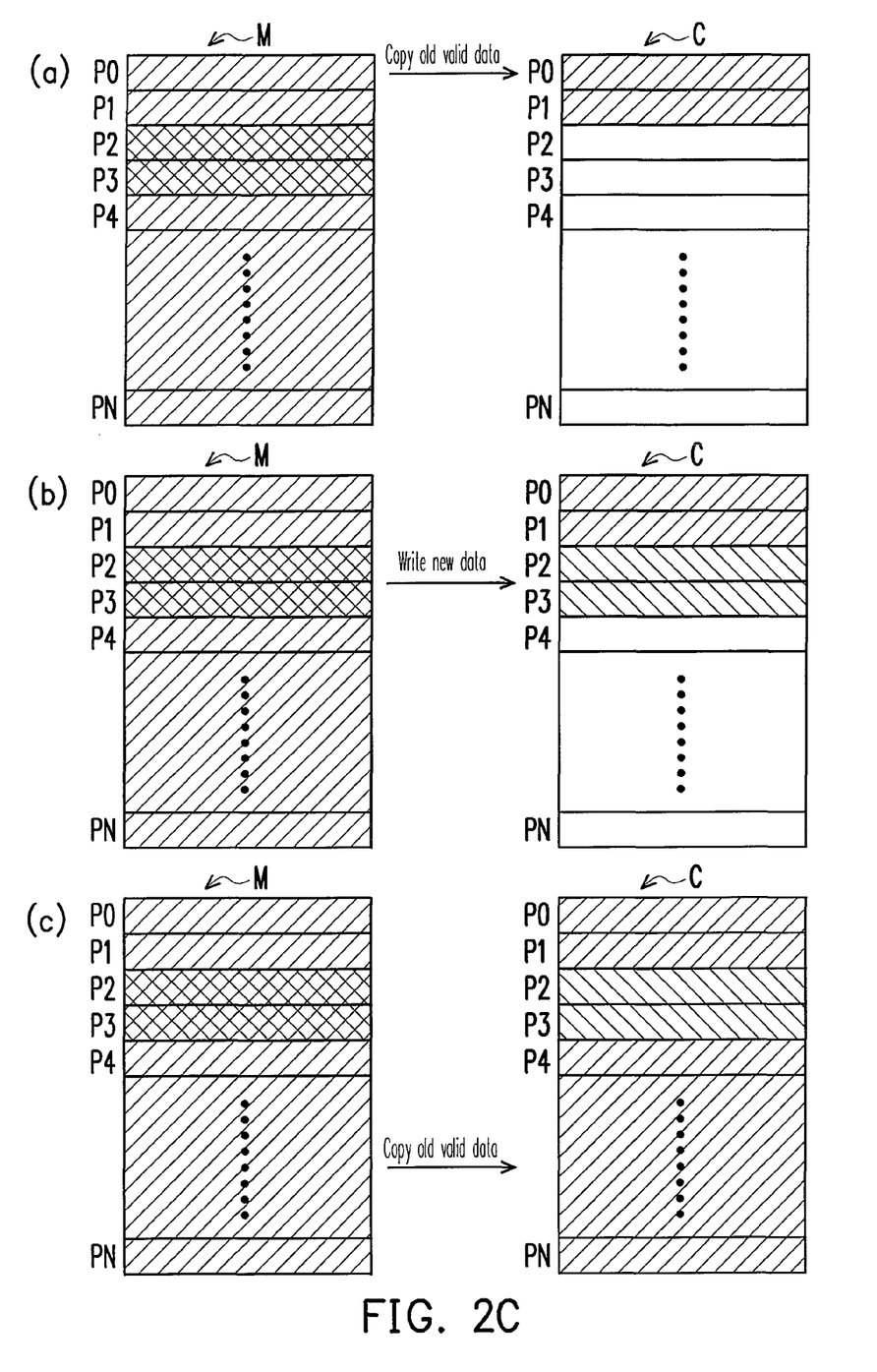

FIGS. 2A~2C are detailed block diagrams of the flash memory 130 and the operations thereof according to the first embodiment of the present invention.

Referring to FIG. 2A, in the present embodiment, in order to program (i.e. write and erase) the flash memory 130 efficiently, the blocks 130-1~130-N in the flash memory 130 are logically grouped into a data area 204 and a spare area 206. Generally speaking, more than 90% of the blocks in the flash memory 130 belong to the data area 204.

Blocks in the data area 204 are used for storing data, and these blocks are usually the blocks corresponding to the logical block addresses (LBAs) operated by the host 200.

Blocks in the spare area 206 are used for substituting the blocks in the data area 204. Accordingly, blocks in the spare area 206 are blank or available blocks, namely, no data is recorded in these blocks or data recorded in these blocks has been marked as invalid data. To be specific, an erasing operation has to be performed before writing data to an address in which data has been recorded. However, as described above, data is written into a flash memory in unit of pages while erased from the same in unit of blocks. Since the erase unit is larger than the write unit, valid pages in a block have to be copied to another block before erasing data from the block. Accordingly, to write a new data into a block M in the data area 204 which already contains a data, a block S is first selected from the spare area 206, and the valid data in the block M is copied to the block S and the new data is also written into the block S. After that, the block M is erased and moved to the spare area 206, and at the same time, the block S is moved to the data area 204. It should be understood that moving the block M to the spare area 206 and moving the block S to the data area 204 are to logically link the block M to the spare area 206 and logically link the block S to the data area 204. It should be understood by those having ordinary knowledge in the art that the logical relationship between the blocks in the data area 204 can be maintained through a logical-physical mapping table.

The blocks are further logically grouped into a substitute block 208 in order to use the flash memory 130 more efficiently. FIG. 2B illustrates another operation of the flash memory, and FIG. 2C is the detailed diagram of the operation in FIG. 2B.

Referring to FIG. 2B and FIG. 2C, the substitute block 208 is used for substituting blocks in the data area 204. To be specific, when a block C is selected from the spare area 206 for substituting a block M in the data area 204, the new data is written into the block C, but all the valid data in the block M is not instantly moved to the block C to erase the block M. To be specific, the valid data (i.e. pages P0 and P1) in the block M before the address for writing the new data is copied into the block C (as shown in FIG. 2C (a)), and the new data (i.e. pages P2 and P3 in the block C) is written into the block C (as shown in FIG. 2C (b)). Here, the block C containing part of the old valid data and the new data is temporarily linked as the substitute block 208. This is because the valid data in the block M may become invalid in a next operation, and accordingly instantly moving all the valid data in the block M to the block C may become meaningless. In the present example, the fact that a plurality of physical block addresses (PBAs) are mapped to one LBA is recorded in a logical-physical block mapping table, namely, the combination of the contents in the block M and the block C is the content of the corresponding logical block. Such a temporary parent-child relationship (between block M and block C) can be determined according to the size of the buffer memory 110d in the flash memory controller 110, and in the present embodiment, five sets of parent-child blocks are described as an example.

Thereafter, the block M and the block C are only integrated into one block when the contents in the block M and the block C are to be actually combined, so that the efficiency in using the blocks can be improved. For example, as shown in FIG. 2C (c), to integrate the blocks, the remaining valid data in the block M (i.e. pages P4~PN) is coped into the block C, and the block M is then erased and linked to the spare area 206. Meanwhile, the block C is linked to the data area 204, and by now the integration of these blocks is completed.

In the present embodiment, the flash memory 130 is a multi level cell (MLC) NAND flash memory. However, the present invention is not limited thereto, and in another embodiment of the present invention, the flash memory may also be a single level cell (SLC) NAND flash memory.

As described above, data loss may be caused in the flash memory 130 when the data stored at the same address is read many times. Thus, in the present embodiment, the microprocessor unit 110a executes a data reading process which can effectively prevent the data loss caused by read disturb.

FIG. 3 is a flowchart of a data reading method according to the first embodiment of the present invention.

Referring to FIG. 3(a), when the flash memory storage system 100 is turned on, which blocks in the data area 204 are frequently read blocks is first determined (step S301). Namely, according to the data reading method in the present embodiment, which blocks in the data area 204 store data to be frequently read is first determined. For example, system data is frequently read. In the present embodiment, the system data is a firmware code or a file allocation table (FAT) of the flash memory storage system 100.

Next, in step S303, a buffer storage area is allocated corresponding to the frequently read block. Namely, according to the data reading method in the present embodiment, buffer storage areas are respectively allocated corresponding to the frequently read blocks. In the present embodiment, a block is selected from the spare area 206 of the flash memory 130 and served as the buffer storage area. However, in another embodiment of the present invention, a block selected from another flash memory or a static random access memory (SRAM) may also be used as the corresponding buffer storage area.

It should be mentioned that as described above, the blocks in the spare area 206 of the flash memory 130 are used for substituting the blocks in the data area 204 for writing data. If blocks in the spare area 206 are used as the buffer storage area, the number of substitute blocks is reduced. Thus, in the present embodiment, it is limited to use five blocks as the buffer storage area. When there are more than five frequently read blocks, only the five blocks which are read relatively more frequently are allocated with buffer storage areas. However, the present invention is not limited thereto, and a system designer can determine the number of blocks which can be used as the buffer storage area according to the number of blocks in the spare area of the flash memory.

In step S305, data stored in the frequently read block is copied to the corresponding buffer storage area.

Referring to FIG. 3(b), in step S307, in order to read data from a block of the flash memory 130, whether the block is the frequently read block determined in step S301 is determined. If it is determined in step S307 that the block is the frequently read block, the data is read from the buffer storage area corresponding to the frequently read block (step S309). If it is determined in step S307 that the block is not the frequently read block, data is read directly from the block (step S311). In other words, in the present embodiment, a copy of the data stored in the frequently read block is stored into the corresponding buffer storage area, and subsequent reads to the frequently read block will be performed to the corresponding buffer storage area instead. Thereby, the problem of read disturb caused by frequently reading the original block can be avoided.

Additionally, since in the present embodiment, a block in the spare area 206 of the flash memory 130 is served as the buffer storage area, read disturb may also be caused to the block in the spare area 206. Accordingly, the data reading method in the present embodiment further includes counting a read number of the corresponding buffer storage area (step S313), such as increasing a counting value by 1, and then determining whether the read number of the buffer storage area corresponding to the frequently read block is greater than a buffer read threshold (step S315), wherein the buffer read threshold is set by the user, and it is indicated that read disturb may soon be caused on the buffer storage area if the read number is greater than the buffer read threshold.

If it is determined in step S315 that the read number of the corresponding buffer storage area is greater than the buffer read threshold, the data stored in the corresponding buffer storage area is copied to another block in the spare area 206 of the flash memory 130, and the another block replaces the original block which is served as the buffer storage area as a new buffer storage area corresponding to the frequently read block (step S317).

Figure 4:
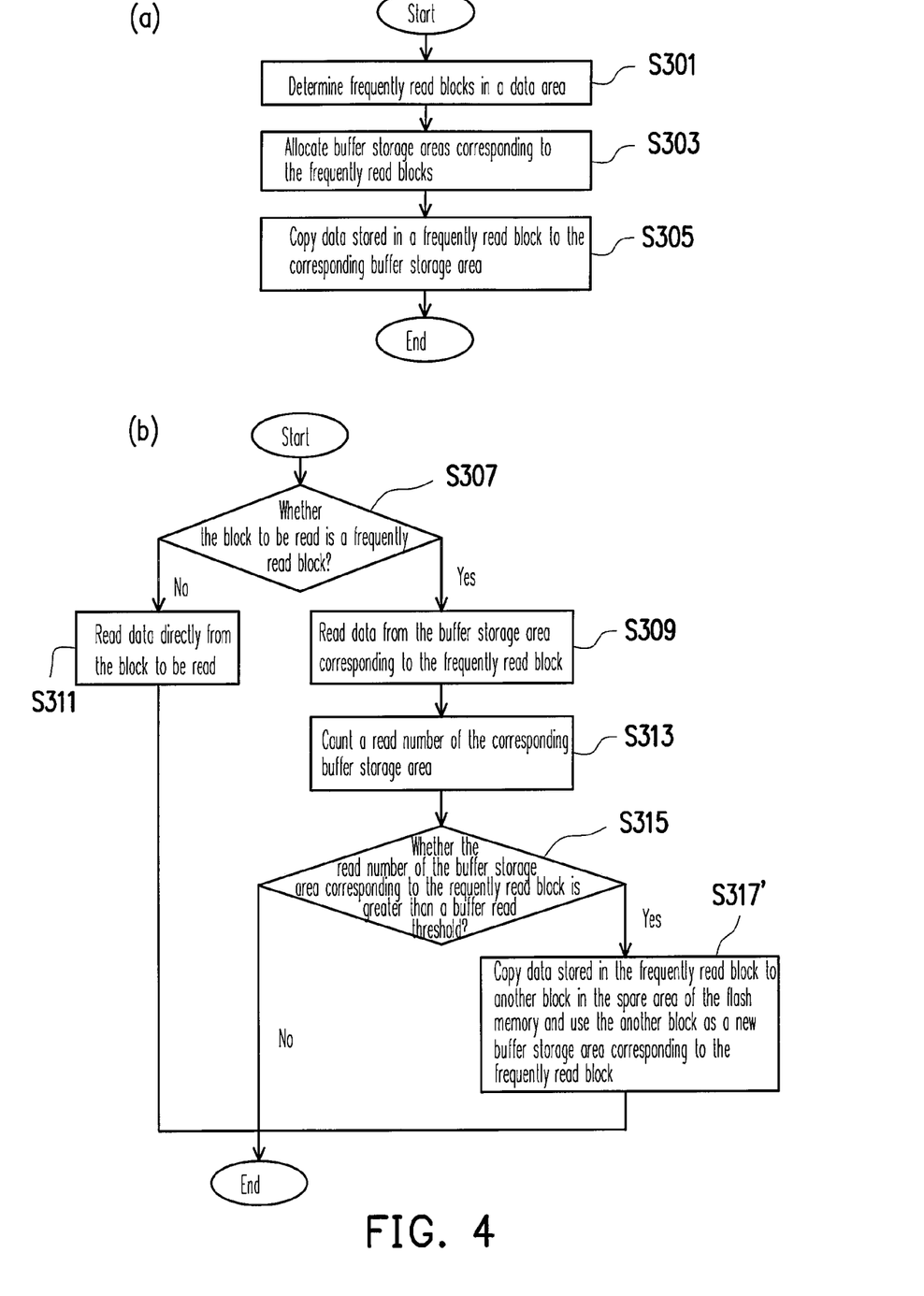
FIG. 4 is a flowchart of a data reading method according to another embodiment of the present invention.

Besides copying the data stored in the corresponding buffer storage area to the another block, in another embodiment of the present invention, the data may also be copied from the frequently read block to this another block (as step S317' in FIG. 4).

[Second Embodiment]

As described above, in the first embodiment, whether read disturb is going to happen to a block in the flash memory 130 which is served as the buffer storage area is determined by using a buffer read threshold so as to allocate a new buffer storage area. However, according to the present invention, foregoing determination may also be done by checking whether the data read from the buffer storage area has any error, so as to allocate the new buffer storage area.

The hardware structure and the operation of the flash memory in the second embodiment of the present invention are similar to those in the first embodiment of the present invention (as shown in FIG. 1 and FIGS. 2A~2C) therefore will not be described herein. The difference between the two embodiments is that in the data reading process of the second embodiment, whether to re-allocate the buffer storage area is determined by checking whether there is any error in the data read from the buffer storage area.

Figure 5:
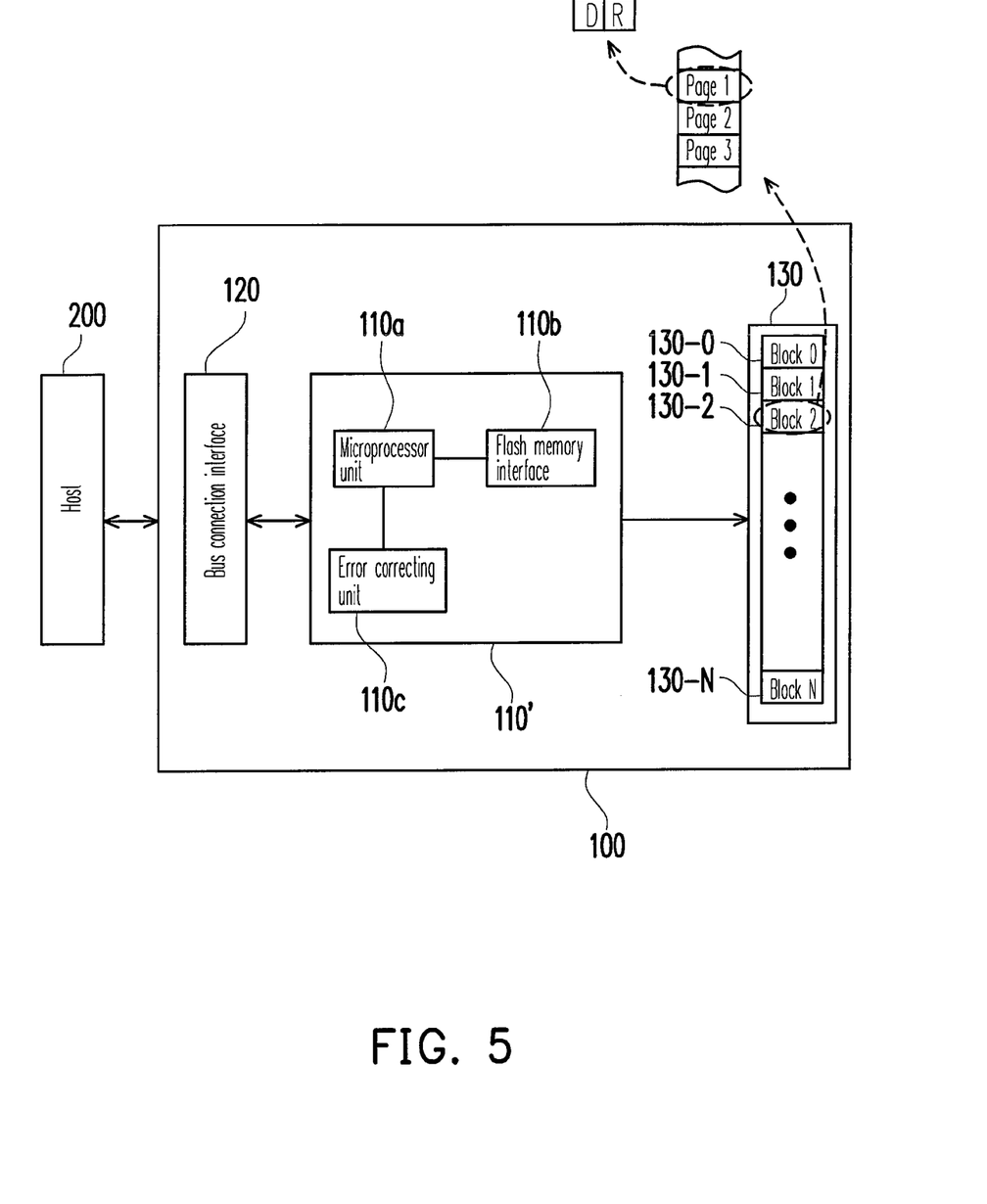
FIG. 5 is a schematic block diagram of a flash memory storage system according to a second embodiment of the present invention.

FIG. 5 is a schematic block diagram of a flash memory storage system according to the second embodiment of the present invention. The difference between the flash memory storage system 100' in FIG. 5 and the flash memory storage system 100 in FIG. 1 is that the flash memory controller 110' of the flash memory storage system 100' further includes an error correcting unit 110c. The error correcting unit 110c is used for correcting data written into or read from the flash memory 130, wherein the error correcting process performed can be easily understood by those skilled in the art therefore will not be described herein.

Figure 6:
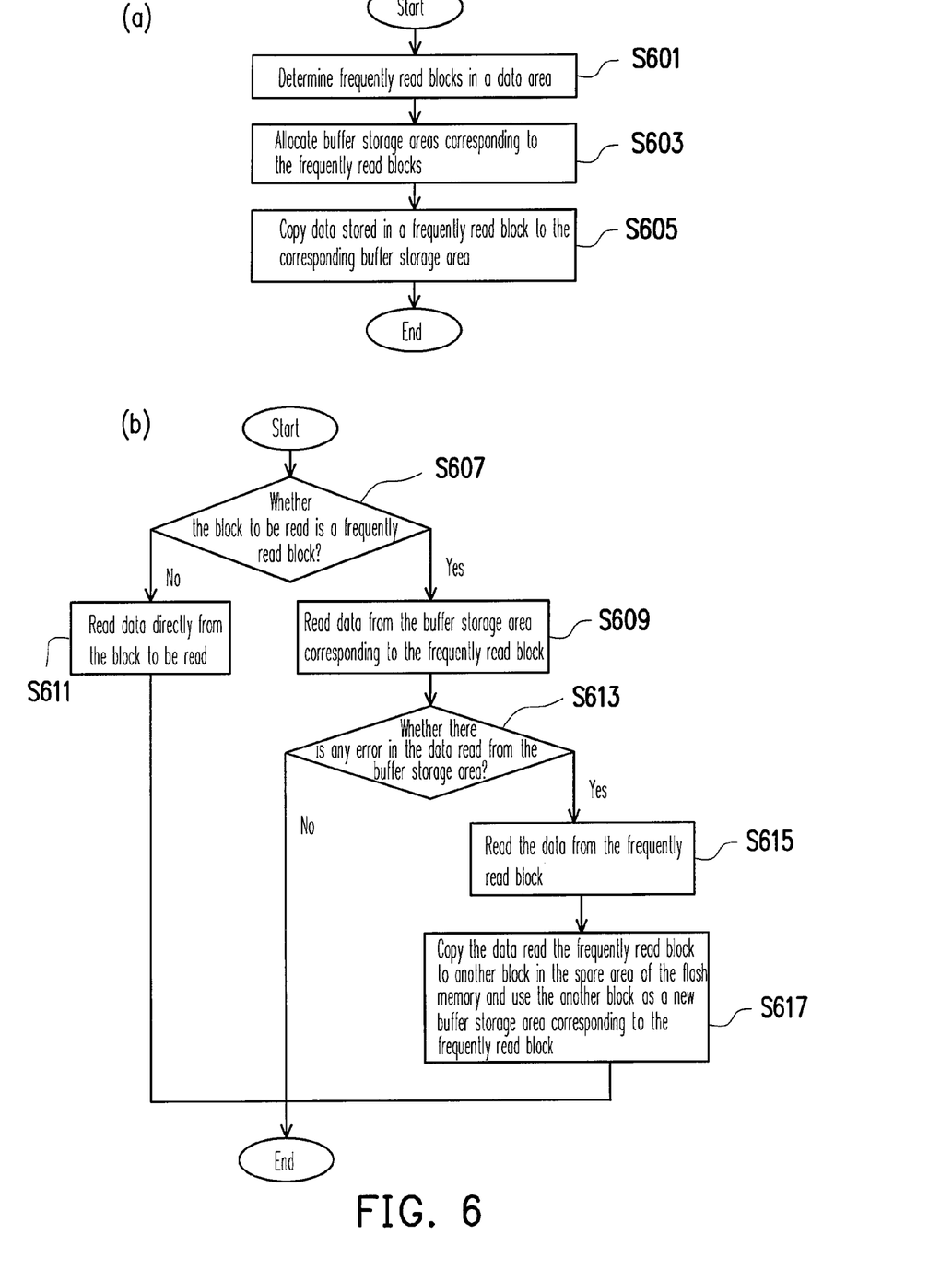
FIG. 6 is a flowchart of a data reading method according to the second embodiment of the present invention.

FIG. 6 is a flowchart of a data reading method according to the second embodiment of the present invention.

Referring to FIG. 6, the steps S601, S603, S605, S607, S609, and S611 are the same as the steps S301, S303, S305, S307, S309, and S311 in FIG. 3 therefore will not be described herein. In step S613, whether there is any error in the data read from the buffer storage area is determined. In the present embodiment, the data is checked by using an ECC generated by the error correcting unit 110c. If it is determined in step S613 that there is an error in the data read from the buffer storage area, in step S615, the data is read from the original frequently read block, and in step S617, the data is copied to another block in the spare area 206 of the flash memory 130 and this another block then replaces the original block which is served as the buffer storage area as a new buffer storage area corresponding to the frequently read block. It should be mentioned that the step S615 may also be executed only when it is determined in step S613 that a number of the occurrence of the error in the data read from the buffer storage area are more than a particular number.

[Third Embodiment]

In the first embodiment and the second embodiment, when the flash memory storage system is turned on, which blocks in the data area are frequently read blocks are first determined so as to allocate the corresponding buffer storage areas and to prevent the problem of read disturb on these frequently read blocks. However, according to the present invention, frequently read blocks in the data area of a flash memory can be dynamically determined in a current operation so as to allocate the buffer storage areas to these frequently read blocks.

The hardware structure and the operation of the flash memory in the third embodiment are the same as those in the first embodiment (as shown in FIG. 1 and FIGS. 2A~2C) therefore will not be described herein.

Figure 7:
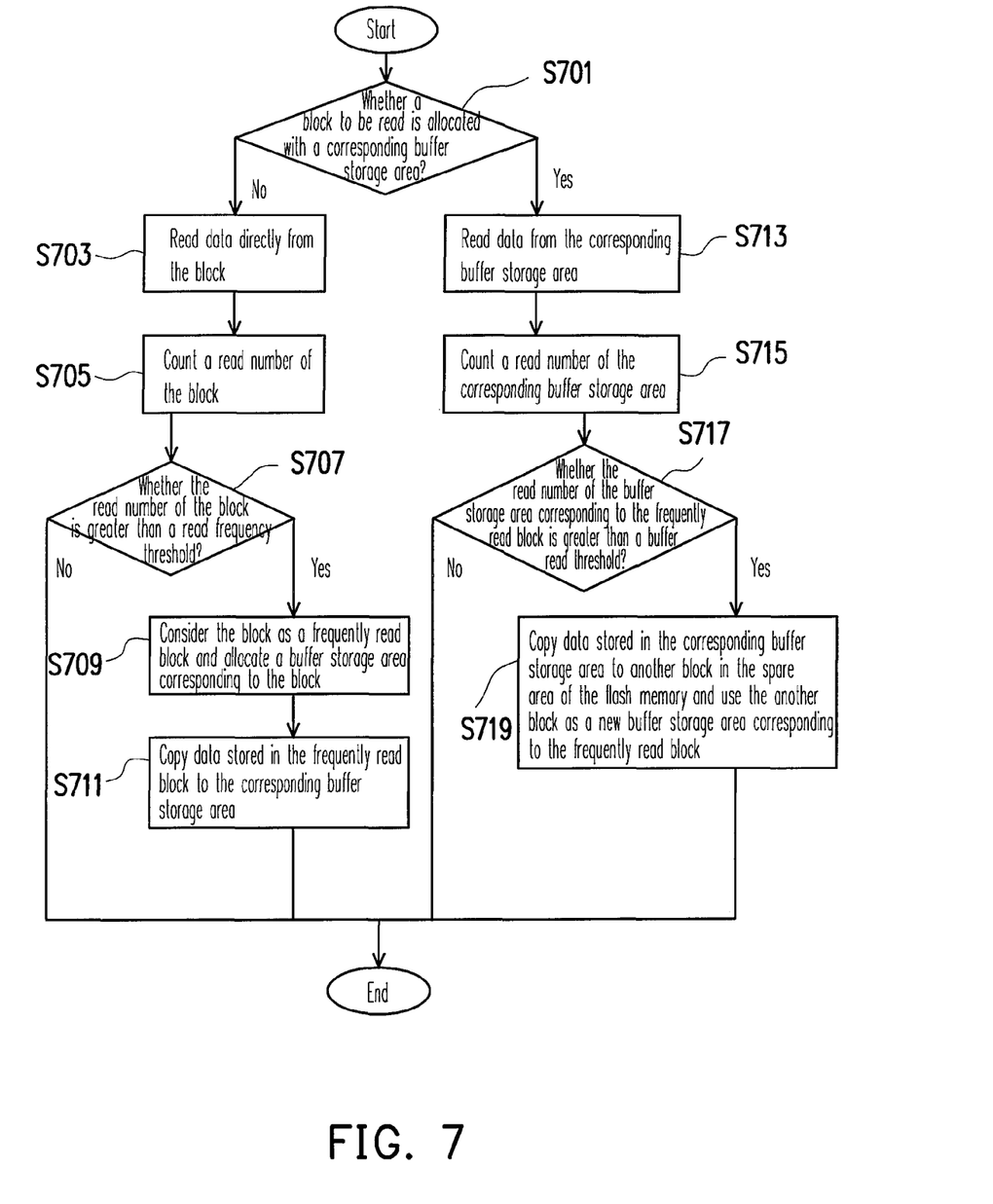
FIG. 7 is a flowchart of a data reading method according to a third embodiment of the present invention.

FIG. 7 is a flowchart of a data reading method according to the third embodiment of the present invention.

Referring to FIG. 7, when the flash memory 130 of the flash memory storage system 100 is to be read, whether the block to be read is allocated with a corresponding buffer storage area is determined in step S701. If it is determined in step S701 that the block to be read is not allocated with a corresponding buffer storage area, data is read directly from this block (step S703).

Next, in step S705, a read number of the block is counted (for example, by increasing the read number by 1). After that, in step S707, whether the read number of this block is greater than a read frequency threshold is determined, wherein the read frequency threshold is set by the user for determining whether a block is a frequently read block.

If it is determined in step S707 that the read number of the block is greater than the read frequency threshold, in step S709, the block is considered as a frequently read block and a buffer storage area is allocated corresponding to this block. In the present embodiment, a block is selected from the spare area 206 of the flash memory 130 and served as the buffer storage area. However, in another embodiment of the present invention, a block selected from another flash memory or a SRAM may also be served as the corresponding buffer storage area.

Similarly, five blocks are used as the buffer storage area in the present embodiment. Only five blocks which are read relatively more frequently are allocated with buffer storage areas when there are more than five frequently read blocks. However, the present invention is not limited thereto, and a system designer may also determine the number of blocks which can be used as the buffer storage area according to the number of blocks in the spare area of the flash memory.

In step S711, data stored in the frequently read block is copied to the corresponding buffer storage area.

If it is determined in step S701 that the block is allocated with a corresponding buffer storage area, data is read from the corresponding buffer storage area (step S713).

As in the first embodiment, in the present embodiment, blocks in the spare area 206 of the flash memory 130 are used as the buffer storage area, and accordingly the problem of read disturb may also be caused on these blocks. Thus, the data reading method in the present embodiment further includes counting a read number of the corresponding buffer storage area (step S715) and determining whether the read number of the buffer storage area corresponding to the frequently read block is greater than a buffer read threshold (step S717), wherein the buffer read threshold is set by the user and used for determining whether read disturb is going to be caused on a buffer storage area.

If it is determined in step S717 that the read number of the corresponding buffer storage area is greater than the buffer read threshold, data stored in the corresponding buffer storage area is copied to another block in the spare area 206 of the flash memory 130 and this another block is used for replacing the original block which is served as the buffer storage area as a new buffer storage area corresponding to the frequently read block (step S719).

Figure 8:
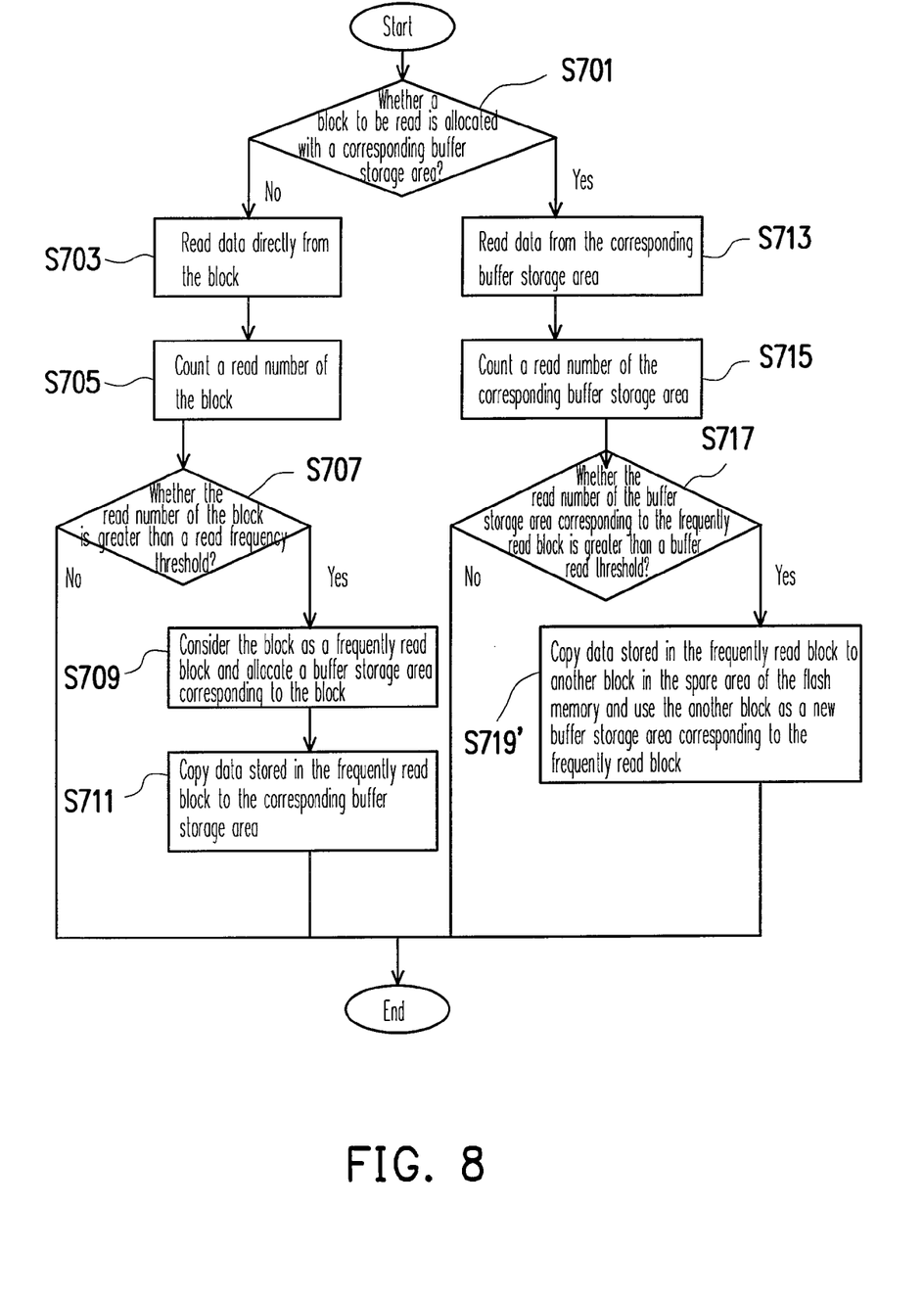
FIG. 8 is a flowchart of a data reading method according to another embodiment of the present invention.

Additionally, besides copying the data from the corresponding buffer storage area to the another block, in another embodiment of the present invention, the data may also be copied from the frequently read block to the another block (as step S719' in FIG. 8).

In the present embodiment, a read number of a block is dynamically counted every time when the block is read and whether the count number is greater than a read frequency threshold is determined so as to allocate a corresponding buffer storage area for storing a copy of the data in this block, and subsequently, if the data stored in the frequently read block is to be read again, the data is read from the corresponding buffer storage area instead of this block. Accordingly, the problem of read disturb caused by frequently reading the original block can be avoided.

[Fourth Embodiment]

In the structure described in the third embodiment, whether read disturb is going to happen to a block in the flash memory 130 which is served as the buffer storage area may also be determined by checking whether the data read from the buffer storage area has any error, so as to re-allocate a new buffer storage area.

Figure 9:
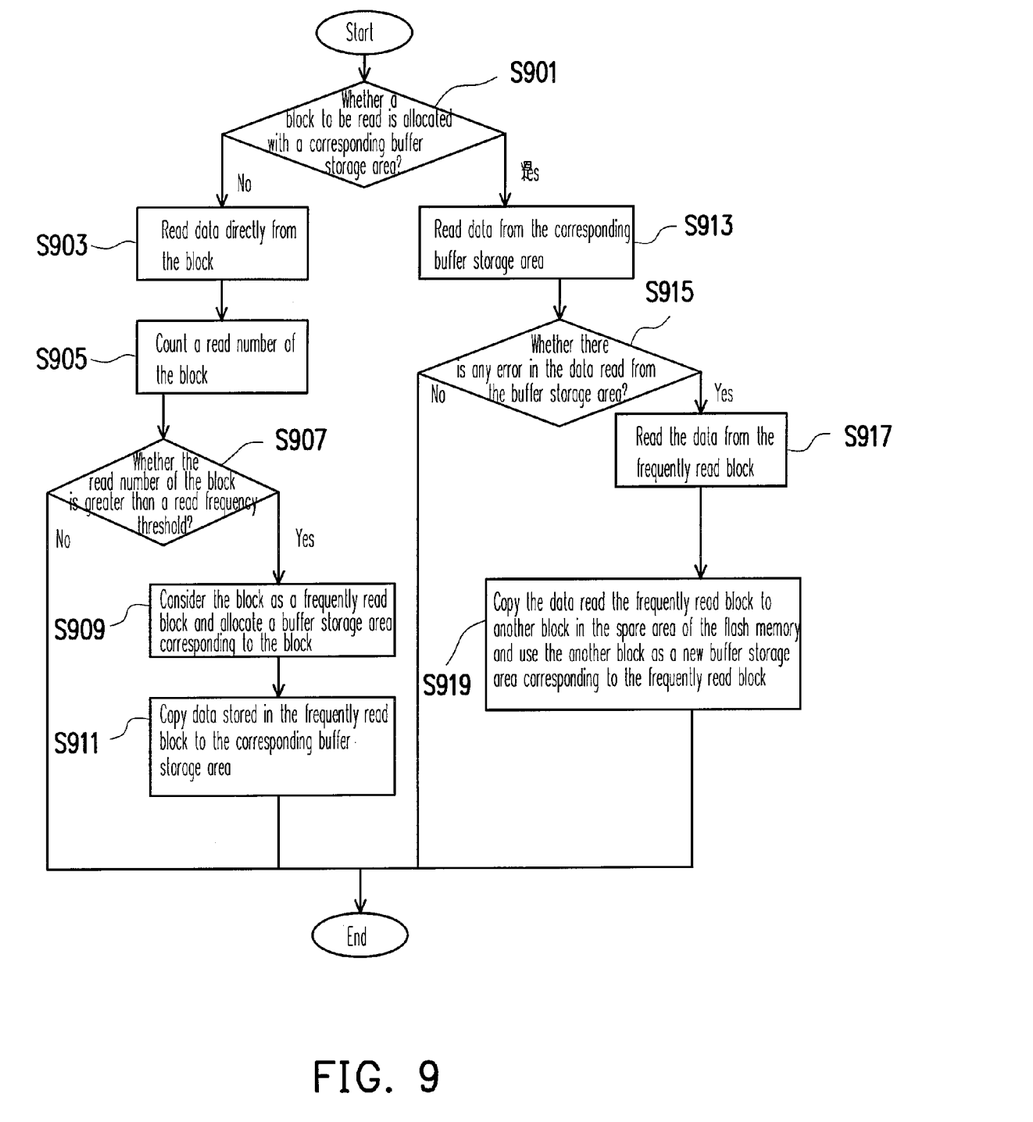
FIG. 9 is a flowchart of a data reading method according to a fourth embodiment of the present invention.

The hardware structure and the operation of the flash memory in the fourth embodiment of the present invention are the same as those in the second embodiment therefore will not be described herein. FIG. 9 is a flowchart of a data reading method according to the fourth embodiment of the present invention.

Referring to FIG. 9, the steps S901, S903, S905, S907, S909, S911, and S913 are the same as the steps S701, S703, S705, S707, S709, S711, and S713 in FIG. 7 therefore will not be described herein.

In step S915, whether there is any error in the data read from the buffer storage area is determined. In the present embodiment, this is done by using an ECC generated by an error correcting unit 110c. If it is determined in step S915 that there is an error in the data read from the buffer storage area, in step S917, data is read directly from the original frequently read block, and in step S919, the data read from the frequently read block is copied to another block in the spare area 206 of the flash memory 130 and this another block is used for replacing the block which is served as the buffer storage area as a new buffer storage area corresponding to the frequently read block.

It should be understood that foregoing execution sequence of steps in embodiments of the present invention is not intended for limiting the present invention, and those skilled in the art should be able to execute the method in different sequence without departing the scope and spirit of the present invention.

In overview, according to the present invention, a buffer storage area is used for storing data in a frequently read block of a flash memory, and data is subsequently read from this buffer storage area instead of the frequently read block. Thereby, the problem of data loss in a flash memory caused by read disturb can be effectively avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data reading method, for a flash memory storage system having a flash memory, wherein the flash memory is substantially divided into a plurality of blocks, and the blocks are grouped into at least a data area and a spare area, the data reading method comprising:

determining that a first block in the data area is a frequently read block;

selecting a second block from the spare area as a buffer storage area corresponding to the first block and copying data stored in the first block to the second block;

reading data belonging to the first block from the buffer storage area when the first block is about to be read;

determining whether there is any error bit in data read from the buffer storage area;

if there is an error bit in data read from the buffer storage area, reading data from the first block; and selecting a third block from the spare area as the buffer storage area corresponding to the first block and copying data read from the first block to the third block.

2. The data reading method according to claim 1, further comprising:

counting a read number of the first block in the data area; and determining whether the read number of the first block in the data area is greater than a read frequency threshold, wherein if the read number of the first block in the data area is greater than the read frequency threshold, the first block in the data area is determined to be the frequently read block.

3. The data reading method according to claim 1, wherein determining whether there is any error bit in data read from the buffer storage area comprises:

executing an error correcting operation to determine whether there is any error bit in data read from the buffer storage area.

4. The data reading method according to claim 1, wherein the frequently read block in the data area stores a firmware code or a file allocation table (FAT) of the flash memory storage system.

5. A flash memory controller, for a flash memory storage system having a flash memory, wherein the flash memory is substantially divided into a plurality of blocks, and the blocks are grouped into at least a data area and a spare area, the flash memory controller comprising:

a microprocessor unit; and a memory interface, coupled to the microprocessor unit and used for accessing the flash memory, wherein the microprocessor unit determines that a first block in the data area is a frequently read block, selects a second block from the spare area as a buffer storage area corresponding to the first block and copies data stored in the first block to the second block, wherein data remains in the first block after data is copied to the buffer storage area, and when the first block is about to be read, the microprocessor unit reads data from the buffer storage area, wherein the microprocessor unit determines whether a read number of the buffer storage area is greater than a buffer read threshold, if the read number of the second block is greater than the buffer read threshold, the microprocessor unit reads data from the first block, selects a third block from the spare area as the buffer storage area corresponding to the first block and copies data read from the first block to the third block.

6. The flash memory controller according to claim 5, wherein the microprocessor unit counts a read number of the first block in the data area and determines that the first block is the frequently read block when the read number of the first block is greater than a read frequency threshold.

7. The flash memory controller according to claim 5, further comprising an error correcting unit determining whether there is any error bit in data read from the buffer storage area.

8. The flash memory controller according to claim 7, wherein if there is an error bit in the data read from the buffer storage area, the microprocessor unit reads data from the first block, selects the third block from the spare area as the buffer storage area corresponding to the first block and copies data read from the first block to the third block.

9. The flash memory controller according to claim 5, wherein the frequently read block in the data area stores a firmware code or a FAT.

10. The flash memory controller according to claim 5, wherein the flash memory is a single level cell (SLC) NAND flash memory or a multi level cell (MLC) NAND flash memory.

11. The flash memory controller according to claim 5, wherein the flash memory storage system is a flash drive, a flash memory card, or a solid state drive (SSD).

12. A flash memory storage system, comprising:
a bus connection interface, for connecting to a host;
a flash memory, wherein the flash memory is substantially divided into a plurality of blocks, and the blocks are grouped into at least a data area and a spare area;
a flash memory controller, coupled to the bus connection interface and the flash memory, wherein the flash memory controller determines that a first block in the data area is a frequently read block, selects a second block from the spare area as a buffer storage area corresponding to the first block and copies data stored in the first block to the second block, wherein data remains in the first block after data is copied to the buffer storage area, and
wherein the flash memory controller reads data from the buffer storage area and determines whether there is any error bit in data read from the buffer storage area when the first block is about to be read,
if there is an error bit in data read from the buffer storage area, the flash memory controller reads data from the first block, selects a third block from the spare area as the buffer storage area corresponding to the first block and copies data read from the first block to the third block.

13. The flash memory storage system according to claim 12, wherein the flash memory controller counts a read number of the first block in the data area and determines that the first block is the frequently read block when the read number of the first block is greater than a read frequency threshold.

14. The flash memory storage system according to claim 12, wherein the frequently read block in the data area stores a firmware code or a FAT.

15. The flash memory storage system according to claim 12, wherein the flash memory is a single level cell (SLC) NAND flash memory or a multi level cell (MLC) NAND flash memory.

16. The flash memory storage system according to claim 12, wherein the flash memory controller has an error correcting unit determining whether there is any error bit in data read from the buffer storage area.

* * * * *